(No Model.)
A. F. GILLET.
DRAFT EQUALIZER.
No. 389,699. Patented Sept. 18, 1888.
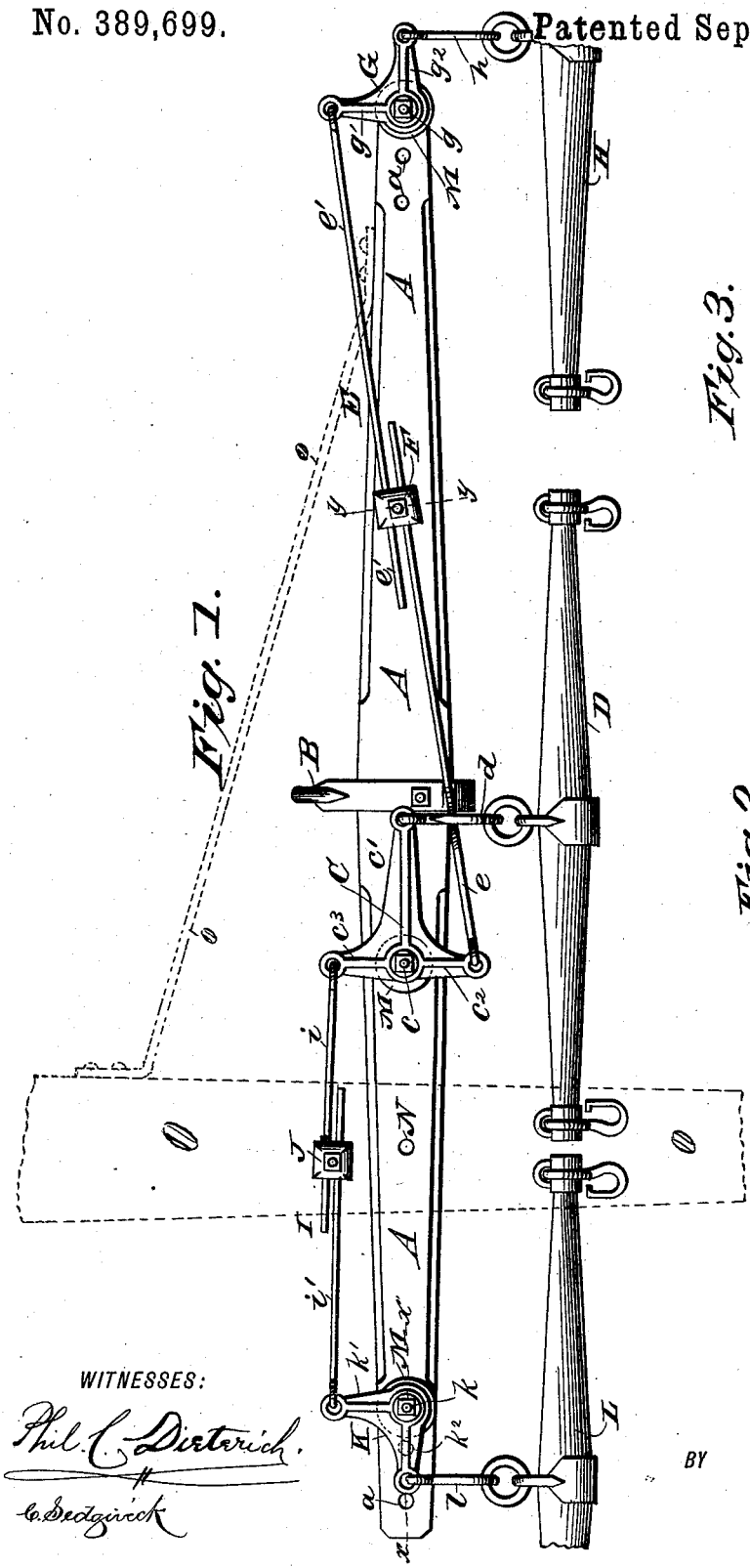
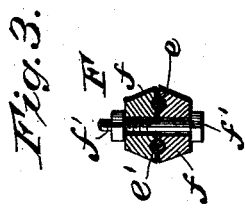
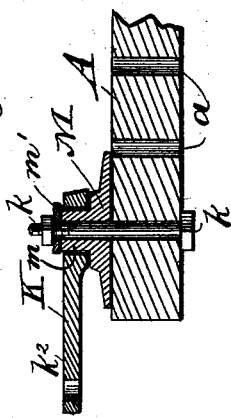
WITNESSES:
Phil. C. Dieterich.
C. Sedgwick
INVENTOR
A. F. Gillet
BY Munn & Co.
ATTORNEY

UNITED STATES PATENT OFFICE.

ALEXIS FRANÇOIS GILLET, OF BURLINGTON JUNCTION, MISSOURI.

DRAFT-EQUALIZER.

SPECIFICATION forming part of Letters Patent No. 389,699, dated September 18, 1888.

Application filed May 12, 1888. Serial No. 273,658. (No model.)

*To all whom it may concern:*

Be it known that I, ALEXIS FRANÇOIS GILLET, of Burlington Junction, in the county of Nodaway and State of Missouri, have invented a new and Improved Draft-Equalizer, of which the following is a full, clear, and exact description.

My invention relates to a draft-equalizing apparatus, and has for its object to provide a simple, inexpensive, light, strong, and readily-adjustable equalizer, which may be easily set for work by any person of ordinary intelligence, for perfectly equalizing the draft of three or four horses while performing various kinds of work.

The invention consists in certain novel features of construction and combinations of parts of the draft-equalizer, all as hereinafter described and claimed.

Reference is to be had to the accompanying drawings, forming a part of this specification, in which similar letters of reference indicate corresponding parts in all the figures.

Figure 1 is a plan view of my improved draft-equalizer with the outside singletrees partly broken away, and also shows in dotted lines a part of an ordinary draft-pole or tongue of a vehicle and its brace. Fig. 2 is a detail longitudinal section taken on the line $x\ x$ in Fig. 1; and Fig. 3 is a transverse section of one of the lever-rod couplings, taken on the line $y\ y$ in Fig. 1.

The draft-equalizer is made with a tripletree or beam, A, which is provided with a central draft hook or iron, B, by which the equalizer may be connected to a plow, harrow, cultivator, or other implement or machine to be drawn by horses hitched to the tripletree, in a manner presently explained. A three-armed or T-shaped lever, C, is held by a bolt or pin, $c$, to the tripletree at one side of its center, and so that the extremity of the stem or long arm $c'$ of the lever reaches about to the center of the tripletree, and thereat is provided with a draft hook or device, $d$, to which the singletree, D, for the middle horse is hitched.

To the forwardly-extending arm $c^2$ of the lever C is connected one end of a rod, $e$, which at its outer part is connected adjustably to a coupling, F, to which is also held the inner end of another rod, $e'$, the outer end of which is connected to the extremity of one arm, $g'$, of an elbow-lever, G, which is held at its angle by a bolt, $g$, to the adjacent outer end of the tripletree, and at the extremity of its other arm, $g^2$, is provided with a hook or hitching device, $h$, to which the singletree H for the "nigh" horse is connected.

To the rearwardly-extending arm $c^3$ of the lever C is connected one end of a rod, $i$, which at its outer part is connected adjustably to a coupling, J, made like the one F, and to which is also held the inner end of another rod, $i'$, the outer end of which is connected to the extremity of one arm, $k'$, of an elbow-lever, K, like the one G, and which is held at its angle by a bolt, $k$, to the adjacent outer end of the tripletree, and at the extremity of its other arm, $k^2$, is provided with a hook or hitching device, $l$, to which the singletree L for the "off" horse is connected.

The rods $e\ e'$, with their coupling F, constitute practically one extensible rod, E, and the rods $i\ i'$, with their coupling J, constitute practically one extensible rod, I. The couplings F J, in a preferred and simple form, consist of two opposite metal plates or blocks, $f\ f$, having grooves receiving the rods and clamped securely thereto by a bolt, $f'$, as shown clearly in Fig. 3 of the drawings, and whereby when the bolt-nut is loosened the rods may be slid in the plates or blocks for endwise adjustment, as may be required.

The angle-levers C G K are all pivoted to the tripletree A in like manner, and as illustrated in the sectional view, Fig. 2, of the drawings, which represents the lever K as connected to the tripletree by the passage of its bolt $k$ through the outer one of a series of holes, $a$, which are provided alike at both ends of the tripletree, for purposes presently explained. A metal plate, M, having a broad base and a central hole to receive the bolt $k$, is first laid on the tripletree, and on its reduced rounded upper end boss, $m$, and against the shoulder formed in making it, is placed the lever K, and on the end of the boss $m$ which projects slightly above the lever is placed a washer, $m'$, onto which the nut of the bolt $k$ is tightly screwed to hold the plate M and the lever securely to the tripletree, while leaving the lever free to rock easily under the washer $m'$ and on the boss $m$, which thus is the axis or fulcrum of the lever. With this construction it is obvious that the large bearing of the plate M on the tripletree, together with the long bearing of the bolt in the plate, prevents bending or breaking of the bolt by the draft strain, and as the lever turns on the boss $m$ of the plate, and not on the bolt, the latter cannot be worn or damaged by the direct pull on the lever, the whole device thus being very simple and efficient and very easily and cheaply made.

The length of the long arm $c'$ of the lever C is twice the length of either of the two arms of the outside levers G K; hence it is manifest that the draft will be equalized for all three horses hitched to the singletrees D H L. Should either one of the outside horses be weaker than the other two animals, the lever, G or K, to which the weaker horse is hitched will be shifted farther from the axis $c$ of the center lever, C, and this explains why the series of holes $a$ are made at opposite ends of the levers. In other words, these holes permit shifting of the lever-bolts in making adjustment of either of the levers G or K inward or outward to accommodate a weaker horse, thus allowing a perfect equalization of the draft proportionately to the strength of the animals. When this adjustment of either of the end levers is made, the sectional rod E or I, connecting this lever with the middle lever, C, will be adjusted accordingly by loosening the bolt $f'$ of the coupling F or J, as required, and allowing endwise movement of the sectional rod in the coupling, which is again tightened by its nut $f'$ after all adjustments are made.

It will be noticed that a perfect equalization of the draft is obtained without requiring a bodily rocking of the tripletree on the hitching-iron B; hence it is practicable to use the equalizer by passing an ordinary hammerstrap pin into a tongue or pole, O, through a hole, N, made in the tripletree at one side of its center, and then brace the longer part of the tripletree or beam to the pole by a staybar, $o$, thus holding the tripletree rigidly to the pole. The pole O and its brace $o$ are shown in dotted lines in Fig. 1 of the drawings. The levers and their extensible connecting-rods may be quickly and easily removed from one tripletree or beam A and be applied to a shorter or longer tree or beam, as different classes of work may require. This equalizer may be used for four horses by hitching two of them to the middle tree, D, and adjusting the two outer levers, G K, accordingly to equalize the draft of all four animals.

Having thus described my invention, what I claim as new, and desire to secure by Letters Patent, is—

1. In a draft equalizer, the combination, with a beam, of a three-armed lever pivoted at one side of the center of the beam and having a draft attachment on its long arm, and bell-crank levers secured to the ends of the beam, each bell-crank lever carrying a draft attachment and connected to the opposite arms of the said three-armed lever, substantially as described.

2. In a draft equalizer, the combination, with a beam, of a three armed lever secured to the beam at one side of its center and carrying a draft attachment on its long arm, bell-crank levers adjustably secured to the ends of the beam and each carrying a draft attachment, and adjustable connections between the bell-crank levers and the three-armed lever, substantially as described.

3. In a draft-equalizer, the combination, with the beam A, of the three-armed lever C, pivoted to the beam and carrying a draft-hook on its long arm, the bell-crank levers G K, pivoted to the ends of the beam and carrying draft-hooks $h$ $l$, respectively, rods $e$ $e'$ and $i$ $i'$, for connecting the bell-crank levers with the three-armed lever, and the clamps F J, for adjustably securing the rods $e$ $e'$ and $i$ $i'$ together, substantially as herein shown and described.

4. In a draft-equalizer, the combination, with the tripletree or beam A and equalizing-levers, as C G K, of a bed-plate, M, having a boss, $m$, onto which the lever is fitted, a washer, $m'$, on the boss over the lever, and a bolt, as $k$, passed through the beam, bed-plate, and washer, and receiving a nut above the washer, substantially as herein set forth.

5. In a draft-equalizer of the character described, the extensible rod-clamps, consisting of opposite plates or blocks having grooves receiving the ends of the sections of the rods, and a bolt clamping the plates to the rods, substantially as herein set forth.

ALEXIS FRANÇOIS GILLET.

Witnesses:
LOUIS GILLET,
D. H. ROCKWELL.